United States Patent [19]
Spiers

[11] Patent Number: 4,913,263
[45] Date of Patent: Apr. 3, 1990

[54] GREASE PACKET FOR FIFTH WHEELS

[76] Inventor: Dennis D. Spiers, 2196 North 450 East, Ogden, Utah 84414

[21] Appl. No.: 264,843

[22] Filed: Oct. 31, 1988

[51] Int. Cl.4 .................... F01M 11/04; B65D 25/08
[52] U.S. Cl. ................... 184/105.1; 206/219; 280/433; 184/109
[58] Field of Search ............... 184/105.1, 109; 206/219, 364; 280/433

[56] References Cited

U.S. PATENT DOCUMENTS

| | | |
|---|---|---|
| 326,156 | 9/1885 | Robinson . |
| 2,083,479 | 6/1937 | Speare ................. 184/105.1 |
| 2,889,922 | 6/1959 | Clarvoe ................. 206/56 |
| 3,438,461 | 4/1969 | MacPherson ............ 184/109 |
| 3,469,655 | 9/1969 | Moreno .................. 184/1 |
| 3,601,252 | 8/1971 | Sager .................... 206/56 |
| 3,858,687 | 1/1975 | Masarky et al. ....... 184/15 R |
| 4,207,289 | 6/1980 | Weiss .................. 422/104 |
| 4,519,866 | 5/1985 | Stol .................... 156/295 |
| 4,537,308 | 8/1985 | Hollander, Jr. ........ 206/219 |
| 4,805,767 | 2/1989 | Newman ................. 206/219 |
| 4,805,926 | 2/1989 | Mamery ................. 280/433 |

FOREIGN PATENT DOCUMENTS 2535151 2/1977 Fed. Rep. of Germany ...... 280/433

*Primary Examiner*—Henry A. Bennet
*Assistant Examiner*—Denise L. Ferensic

[57] ABSTRACT

A packaged grease composition for lubrication of fifth wheels on tractor-trailers or similar vehicles is disclosed. The packet consists of a grease composition sealed in a thin walled plastic envelope. The grease filled envelope is placed on the base plate of the fifth wheel and the envelope readily ruptures under pressure when the plates forming the fifth wheel come together releasing the grease to lubricate the plates. The plastic subsequently disintegrates as these plates rotate on each other leaving no environmental waste to dispose of. The envelope may come in different shapes or the lubricant or envelope may be color coded to indicate the type of lubricant contained within the envelope.

24 Claims, 1 Drawing Sheet

GREASE PACKET FOR FIFTH WHEELS

This invention relates to a packaged grease composition for lubrication of the fifth wheels on tractor-trailers or similar vehicles. More particularly, this invention relates to a grease composition sealed in a plastic envelope which readily ruptures under pressure when the plates forming the fifth wheel come together releasing the grease and wherein the plastic subsequently disintegrates as these plates rotate on each other. The packaged grease composition may be coded to insure the use of the proper composition under various conditions of use.

BACKGROUND OF THE INVENTION AND DISCUSSION OF PRIOR ART

The movement of goods from points of origin or manufacture to points of consumption or sale often involves the use of tractor trucks pulling trailers, or semitrailers as they are sometimes called. These vehicles are heavy and expensive and require considerable servicing and upkeep to keep them on the road for maximum usage. The tractor portion of this combination has a "fifth wheel" attachment consisting of a base wheel or plate horizontally secured above the rear axle of the tractor. The tractor is attached to the trailer by backing the tractor under the forward end of the trailer to engage an upper plate contained therein such that the upper plate is secured to and rests horizontally on the base plate of the fifth wheel. These upper and base plates provide the connection between the tractor and trailer and rotate relative to each other in a horizontal plane to allow the truck to turn relative to the trailer. Obviously, the facing surfaces of the base and upper plates must be adequately lubricated to minimize wear and friction since these surfaces are constantly rotating against each other.

Heretofore, the only means of lubricating these fifth wheel plate surfaces has been to use a grease gun and spread grease on the surface of the base plate prior to connection of the tractor to the trailer. This is messy and time consuming. It requires the driver of the tractor to carry a grease gun. Sometimes different grease formulations are preferred depending upon loads, weather conditions, etc. In that case the driver has to carry more than one grease gun to make sure the proper grease is available and must identify which grease is to be used under the existing conditions. Many times connections and disconnections of tractors from trailers are made in remote locations where grease may not be readily available. Connections are required in all types of weather. During inclement weather, and particularly in the winter when temperatures are low, grease is difficult to apply due to high viscosities. Also, since blizzard conditions often prevail, there is little incentive to climb from a warm tractor cab, identify the grease gun having the correct grease formulation and force grease from the gun onto a base plate. Often it is necessary to make or switch connections rapidly to meet time schedules and the like. In each case, the necessity of greasing the fifth wheel by means of a grease gun is inconvenient and slows the operation. Safety is also a consideration when applying grease from a gun onto a surface or between surfaces of mating plates of a tractor-trailer combination. Sometimes cramped or close quarters are encountered. It may also be necessary to climb onto the back of the tractor to apply the lubricant to the base plate.

Another problem encountered is that the amount of grease to apply is not always easy to determine because connections are often made during night time hours when visibility is diminished. Because greasing the fifth wheel is such a messy and undesirable job it is sometimes ignored by drivers or service personnel resulting ultimately in breakdowns and increased costs for repairs or replacements.

A search of the art relative to prepackaged grease compositions for lubricating fifth wheels or similar sliding surfaces did not show anything which was considered to be relevant.

Masarky, et al., U.S. Pat. No. 3,858,687, shows a strip of prepackaged fluid lubricant containing envelopes having an adhesive coating on one side. The envelopes are adhesively attached to a cable to enable it to be lubricated as it is passed through a conduit. Friction between the cable and conduit cause the envelopes to burst when lubrication is needed.

Robinson, U.S. Pat. No. 326,156, shows a lubricator for journals and bearings consisting of a closed canvas bag containing grease. The action of moving parts against the bag causes the grease to flow through the pores in the canvas.

Moreno, U.S. Pat. No. 3,469,655, illustrates a grease packer for lubricating automobile front wheel bearings consisting of a cup of grease retentive material sized and shaped to fit over a bearing. A strip-off protective cover seals the cup until ready for use. The cover is stripped off and the cup is inverted over the bearing and pressed to force grease into the bearing.

Sager, U.S. Pat. No. 3,601,252, shows a container having a tubular portion of heat sealable material adapted to hold liquid, granular or solid materials, and which is sealed at one end in such a manner that the seal will rupture when a predetermined pressure is applied at the opposite end. However, usage for purposes of lubrication is not mentioned.

Clarevoe, U.S. Pat. No. 2,889,922, and Stol, U.S. Pat. No. 4,519,866, both show encapsulated adhesives which rupture upon the application of pressure to cause facing surfaces to adhere to each other.

OBJECTS AND BRIEF SUMMARY OF THE INVENTION

It is an object of the present invention to provide prepackaged means for quickly and efficiently applying premeasured amounts of lubrication to fifth wheels and similar devices.

It is further an object of the invention to provide means for coding the prepackaged lubricant to allow for quick and efficient application of the correct lubricant composition that existing conditions require.

It is also an object of the invention to provide premeasured amounts of grease in a plastic envelope which readily ruptures between the plates of the fifth wheel releasing the grease and wherein the plastic disintegrates under frictional forces without leaving any waste to dispose of or adversely affecting the lubrication properties of the grease.

Additionally, an object of the invention is to provide a safe means for applying a lubricant to mating surfaces of a tractor-trailer or similar combination which does not require climbing onto the tractor or working in cramped spaces.

These and other objects may be accomplished by means of a thin plastic envelope of any suitable size having sealed therein a premeasured amount of a lubricant such as grease or oil. The lubricant or plastic envelope may be colored to allow for visual identification or lubricant composition, or the envelope may be shaped so as to allow for visual or tactile identification. The plastic walls of the envelope must be sufficiently thin that the envelope will rupture when the base and upper plates of the fifth wheel come in contact and the plastic must disintegrate under the frictional rotational forces of these plates leaving no disposable waste. There is no specific requirement that the plastic be of any particular chemical composition provided it is sufficiently strong to contain the grease in packaged form prior to use and will disintegrate in the manner specified.

DETAILED DESCRIPTION OF THE INVENTION

Figure 1:
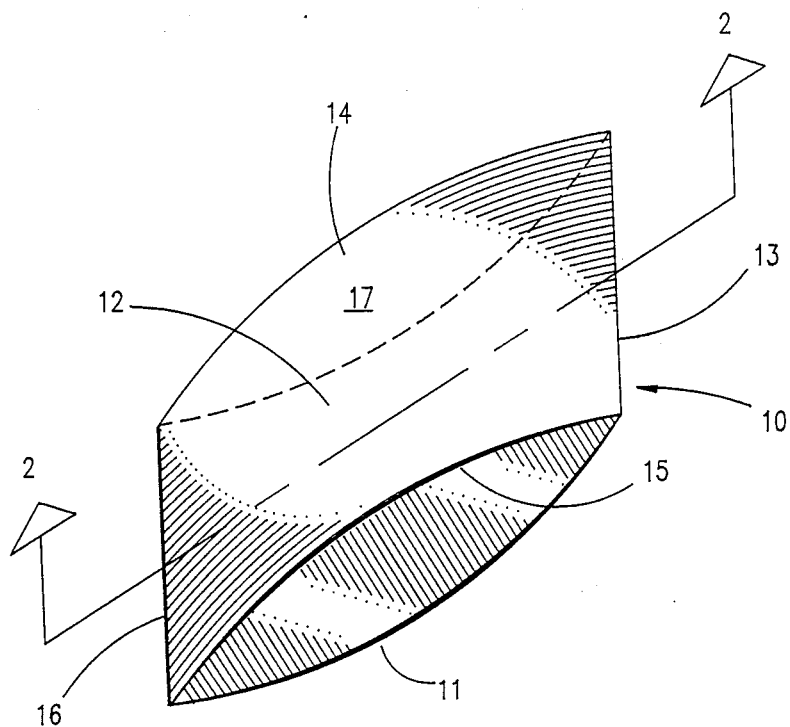
FIG. 1 is a perspective view of a plastic envelope containing a premeasured amount of grease.
Figure 2:
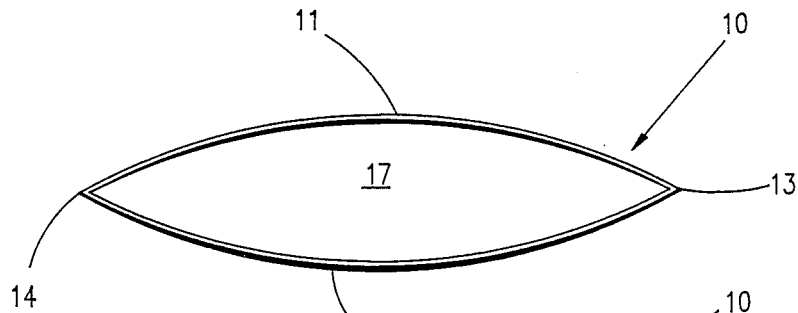
FIG. 2 is a side sectional view of the envelope shown in FIG. 1 taken along lines 2—2 thereof.
Figure 3:
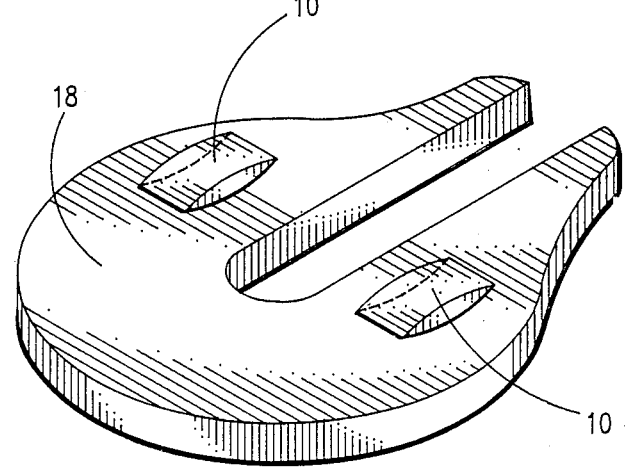
FIG. 3 is a perspective view showing a grease filled plastic envelope deposited on the surface of the base plate of a fifth wheel.

There is shown in FIGS. 1 to 3 a complete and preferred embodiment of the invention. FIG. 1 shows a generally rectangular envelope 10 consisting of front and back walls 11 and 12 sealed to each other along all four edges 13, 14, 15 and 16 and having a premeasured amount of grease 17 contained therein. The envelope 10 can be of any desired configuration, i.e. round, oval, square, spherical, cylindrical, etc. for purposes of coding the lubricant composition, or for matching the shape of the surfaces to be lubricated, without departing from the scope of the invention. The only requirement is that the interior have sufficient space to hold the desired volume of grease. However, for purposes of description it will be described in terms of a square or rectangular envelope.

Any suitable heat sealable thermoplastic material may be used in constructing the envelope. Without intending any limitation, typical polymers include polyamides, polyethylene, polypropylene, polystyrene, polyvinyl chloride, polyvinyl acetate, polytetrafluoroethylene, ethylene-vinyl chloride compolymers, ethylene-vinyl acetate copolymers and the like.

Depending upon the polymers utilized the envelope may be clear, translucent or may have a dye or other coloring material added thereto.

The walls 11 and 12 are made of sufficient thickness that they will contain the grease within the interior of the envelope. Typically, thicknesses of between about 0.5 and 5.0 mils are sufficient. Also, the heat seals at the edges 13, 14, 15 and 16 must be sufficiently strong that they will not be severed under normal filling, packaging and transportation. While the envelope has been described as having four heat sealed sides, it is evident that a single sheet of plastic could be folded back on itself at the bottom and sealed at the side edges. Or, in the alternative, an envelope could be injection molded of a single piece of material having no heat sealed side or bottom edges and having an open top which, after the interior had been filled with grease, could be heat sealed.

Generally, envelopes holding about 0.5 to 16 ounces (or about 14 to 454 grams) of grease are considered to be appropriate for lubrication purposes. This of course will depend upon the area to be lubricated. It may be advisable to place one, two or more envelopes on the base plate of the fifth wheel. Square or rectangular envelopes containing this amount of grease will generally vary dimensionally in size between about 2"×2"×0.25" to about 6"×6"×1".

The grease used may be any lubricant suitable for the purposes including, but not limited to, soap or clay thickened hydrocarbon greases, synthetic greases such as silicones and the like.

FIG. 3 shows the placement of the envelopes 10 on the base plate 18 of a fifth wheel. All one has to do is toss or place the envelope 10 on the upper surface of the base plate. One does not have to climb on the rear of the tractor as in the case of using a grease gun. This is a significant safety improvement, particularly under icy or wet weather conditions. There is generally sufficient lubrication from previous uses that the envelope stays in place. Once the desired number of envelopes has been distributed on the base plate, the tractor is backed under the trailer causing the base plate 18 to engage the surface of the upper plate. The force of bringing the two plates together causes the envelope to rupture, releasing the grease onto the plate surfaces. The rotation of the plates against each other further causes the grease to be evenly distributed. The constant rotation of the two plates also causes the plastic envelope to wear and disintegrate. In many instances, such as in the case of polytetrafluorotheylene, the plastic actually contributes to the lubricating properties. However, the basic function of the plastic is not as a lubricant but as a carrier envelope which does not adversely affect the lubricating properties of the grease and which does not require disposal. Since the plastic is literally "used up" by the frictional rotation between the base and upper plates, there is no environmental waste to dispose of.

It is apparent that, in utilizing the present invention, there are many advantages. The envelopes are easy to carry and do not require special equipment such as a grease gun. The envelopes can be placed on the base plate at the time the tractor and trailer are connected and hence do not require advance preparation. The type of composition of the grease contained in the envelopes can be readily identified thus avoiding application of an improper grease composition. In cold or stormy weather, the driver does not have to "weather the storm" in order to lubricate the fifth wheel. He merely has to toss the desired number of envelopes on the base plate and back the tractor under the trailer. The envelopes, being sealed, keep the grease from drying or forming a crust on the surface. Moreover, being sealed, the envelopes may be handled with bare hands and do not require the use of gloves or other protective clothing to keep grease from coming into contact with the person applying the envelopes.

It is apparent that the envelopes may be used for lubricating any device where there are mating surfaces which frictionally slide or rotate on each other and which can accommodate the placement of a grease containing envelope between the surfaces, and is not limited to the fifth wheel of tractor trailer combinations only. Other uses and applications will become obvious to those skilled in the art from the above disclosure. Therefore, the invention is to be limited in scope only by the appended claims and their functional equivalents.

I claim:

1. A device for lubricating sliding mating surfaces consisting of a sealed thin plastic envelope of lubricating material, rupturable under pressure, and containing a predetermined amount of a lubricating agent, said lubricative material being polytetrafloroethylene.

2. A device according to claim 1 wherein the envelope has opposing sidewalls sealed to each other along their respective perimeters.

3. A device according to claim 2 wherein the envelope walls have a thickness of between about 0.5 and 5.0 mils.

4. A device according to claim 3 having a generally square or rectangular shape.

5. A device according to claim 4 having dimensions of between 2"×2"×0.25" and 6"×6"×1".

6. A device according to claim 5 wherein the grease content varies between about 0.5 and 16 ounces.

7. A device according to claim 1 further comprising a coding means.

8. A device according to claim 7 wherein the coding means is a dye in said lubricant.

9. A device according to claim 7 wherein the coding means is a dye in said plastic envelope.

10. A device according to claim 7 wherein the coding means is in the shape of said plastic envelope.

11. A method of lubricating the mating surfaces of sliding mating tractor and trailer plates which form the fifth wheel of a tractor-trailer combination which comprises applying to one mating surface a prepackaged lubricant consisting of a sealed thin plastic envelope, rupturable under pressure, containing a predetermined amount of a lubricating agent.

12. A method according to claim 11 wherein the envelope is ruptured by pressure applied to the mating surfaces.

13. A method according to claim 12 wherein the entire content of the envelope is released upon rupture.

14. A method according to claim 11 wherein the envelopes are coded according to the lubricant composition.

15. A method according to claim 14 wherein the lubricant compositions are chosen and applied to the mating surface to meet requirements of existing conditions.

16. A method according to claim 11 wherein the envelope itself also aids in lubrication.

17. A method according to claim 11 wherein the plastic is a thermoplastic.

18. A method according to claim 17 wherein the lubricating agent is a grease.

19. A method according to claim 18 wherein the envelope has opposing sidewalls sealed to each other along their respective perimeters.

20. A method according to claim 19 wherein the envelope walls have a thickness of between 0.5 and 5.0 mils.

21. A method according to claim 20 wherein the envelope has a generally rectangular shape.

22. A method according to claim 21 wherein the envelope has dimensions of between 2"×2"×0.25" and 6"×6"×1".

23. A method according to claim 22 wherein the grease content varies between 0.5 and 16 ounces.

24. A method of lubricating the mating surfaces of sliding mating tractor and trailer plates which form a fifth wheel of a tractor-trailer combination which comprises placing at least one lubricant package on the mating surface of the tractor plate portion of the fifth wheel, said lubricant package consisting of a sealed thin plastic envelope, rupturable under pressure, containing a predetermined amount of a lubricating agent, mating said trailer plate to said tractor plate, thereby rupturing said thin plastic envelope and dispersing said lubricating agent between said plate mating surfaces.

* * * * *